United States Patent [19]
Hansson et al.

[11] Patent Number: 6,112,498
[45] Date of Patent: Sep. 5, 2000

[54] PACKAGING UNIT FOR CONTINUOUSLY PRODUCING SEALED PACKAGES, CONTAINING POURABLE FOOD PRODUCTS, FROM A TUBE OF PACKAGING MATERIAL

[75] Inventors: Lennart Hansson, Bjarred; Felix Dunge, Goteborg; Lennart Friberg, Vollsjo, all of Sweden

[73] Assignee: Tetra Laval Holdings & Finance S.A., Pully, Switzerland

[21] Appl. No.: 09/094,979

[22] Filed: Jun. 15, 1998

[30] Foreign Application Priority Data

Jun. 27, 1997 [EP] European Pat. Off. .............. 97830315

[51] Int. Cl.$^7$ .............................. B65B 9/06; B65B 57/04
[52] U.S. Cl. ...................................... 53/69; 53/75; 53/551
[58] Field of Search ................................ 53/551, 552, 51, 53/75, 64

[56] References Cited

U.S. PATENT DOCUMENTS

| | | |
|---|---|---|
| 2,738,631 | 3/1956 | Järund . |
| 2,741,079 | 4/1956 | Rausing . |
| 2,784,540 | 3/1957 | Järund . |
| 3,300,944 | 1/1967 | Thesing . |
| 3,320,718 | 5/1967 | Thesing . |
| 3,325,961 | 6/1967 | Lindh et al. ............................ 53/551 |
| 3,388,525 | 6/1968 | Thesing et al. . |
| 3,388,526 | 6/1968 | Harm et al. . |
| 3,417,674 | 12/1968 | Abrahamson ............................ 53/51 |
| 3,444,792 | 5/1969 | Thesing et al. . |
| 3,555,652 | 1/1971 | Ignell . |
| 3,729,894 | 5/1973 | Stohlquist . |
| 4,074,961 | 2/1978 | Reil . |
| 4,387,547 | 6/1983 | Reil . |
| 5,155,980 | 10/1992 | Mansson et al. . |

*Primary Examiner*—John Sipos
*Attorney, Agent, or Firm*—Burns, Doane, Swecker & Mathis, L.L.P.

[57] ABSTRACT

A packaging unit (1) for continuously producing aseptic sealed packages (2), containing a pourable food product, from a tube (14) of packaging material filled with the food product; the unit (1) has a first and second chain conveyor (10, 11) respectively having a number of jaws (12) and a number of counter-jaws (13), which cooperate with and grip the tube (14) to heat-seal the tube at successive cross sections (54) by means of induction heating elements (29) on the jaws (12); and each jaw (12) has a pair of movable elements (60) for interacting with and correcting supply of the tube (14), and the travel of which is controlled by a control assembly (95) in response to a signal (107) related to the position of designs (31) on the packaging material.

8 Claims, 10 Drawing Sheets

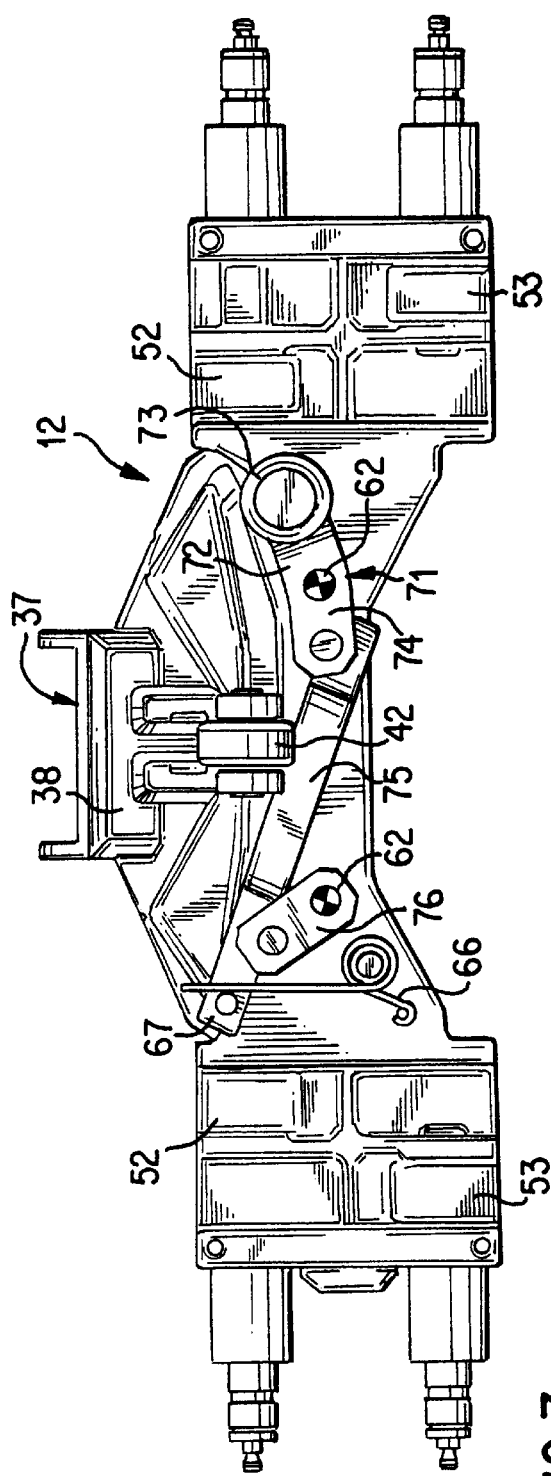
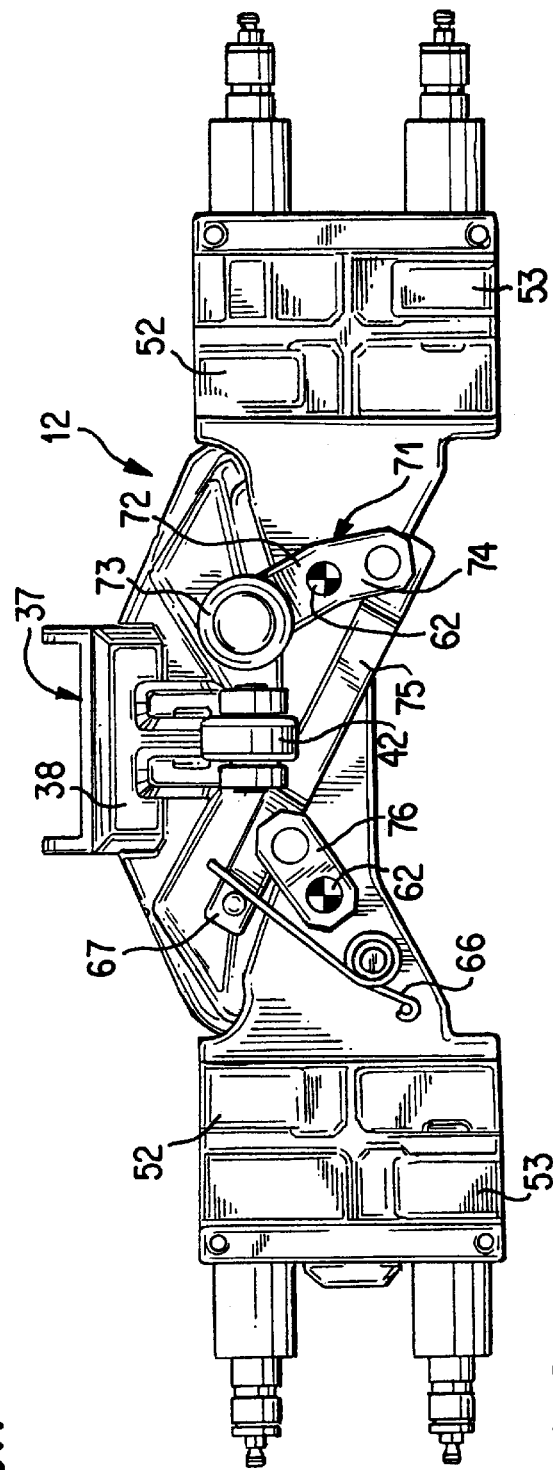
FIG. 7
FIG. 8

PACKAGING UNIT FOR CONTINUOUSLY PRODUCING SEALED PACKAGES, CONTAINING POURABLE FOOD PRODUCTS, FROM A TUBE OF PACKAGING MATERIAL

The present invention relates to a packaging unit for continuously producing aseptic sealed packages, containing pourable food products, from a tube of packaging material.

More specifically, the packaging unit according to the present invention provides for producing substantially parallelepiped aseptic sealed packages.

Many pourable food products, such as fruit juice, pasteurized or UHT (ultra-high-temperature treated) milk, wine, tomato sauce, etc., are sold in packages made of sterilized packaging material.

A typical example of such a package is the parallelepiped packaging container for liquid or pourable food products known by the name of Tetra Brik Aseptic (registered trademark), which is formed by folding and sealing a strip-rolled packaging material. The rolled packaging material comprises layers of fibrous material, e.g. paper, covered on both sides with thermoplastic material, e.g. polyethylene; and the side of the packaging material eventually contacting the food product in the package also comprises a layer of barrier material, e.g. an aluminium sheet, in turn covered with a layer of thermoplastic material.

As is known, packages of the above type are produced on fully automatic packaging machines, on which a continuous tube is formed from the packaging material supplied in strip form. The strip of packaging material is sterilized on the packaging machine, e.g. by applying a chemical sterilizing agent, such as a hydrogen peroxide solution; following sterilization, the sterilizing agent is removed, e.g. vaporized by heating, from the surfaces of the packaging material; and the strip of packaging material so sterilized is kept in a closed sterile environment, and is folded and sealed longitudinally to form a tube.

The tube is filled with the sterilized or sterile-processed food product, and is sealed at equally spaced cross sections at which it is then cut into pillow-pack packets, which are subsequently folded mechanically into parallelepiped packages.

The packaging material is preprinted on one face with a succession of identical, equally spaced designs located on the portions eventually forming the outer surfaces of the packages.

Packaging machines of the above type are known, which comprise two chain conveyors defining respective endless paths and respectively fitted with a number of jaws and counter-jaws. The two paths comprise respective branches substantially facing and parallel to each other, and between which the tube of packaging material is fed; and the jaws on one conveyor cooperate, along said branches of the respective paths, with corresponding counter-jaws on the other conveyor to grip the tube at a number of successive cross sections and so seal the packages.

Machines of this sort are illustrated, for example, in U.S. Pat. No. Re 33,467.

A major problem of such machines is ensuring the tube of packaging material is so fed that the packages are formed, sealed and cut according to the designs printed on the packaging material, the set theoretical location of which may shift due to varying deformation of the packaging material when this is subjected to mechanical pressure by the jaws and counter-jaws and filled with a liquid or semi-liquid food product in turn subject to pulsating pressure.

On packaging machines operating at high output speeds, even a minor shift in the set theoretical location of the designs, if not corrected in real time, may eventually increase to the point that the packages produced must be rejected.

It is an object of the present invention to provide a packaging unit for continuously producing aseptic sealed packages containing pourable food products, and which provides for eliminating the aforementioned drawback typically associated with known machines.

According to the present invention, there is provided a packaging unit for continuously producing aseptic sealed packages, containing a pourable food product, from a tube made of heat-seal packaging material in sheet form, fed along a vertical supply path, and filled with said food product; said tube of packaging material comprising a succession of identical, equally spaced designs located on the portions eventually forming the outer surface of said packages;

said unit comprising:
  a first chain conveyor having a number of jaws, and defining an endless first path along which said jaws are fed;
  a second chain conveyor having a number of counter-jaws, and defining an endless second path along which said counter-jaws are fed;
  said first and said second path comprising respective work portions adjacent to said supply path of the tube of packaging material, and extending substantially symmetrically on opposite sides of said supply path, so that said jaws cooperate with respective said counter-jaws to grip and heat-seal respective equally spaced transverse bands of said tube;
  characterized in that said jaws comprise drawing means movable with respect to the jaws and interacting with said tube of packaging material to correctly feed said tube along said supply path; and control means for controlling said drawing means in response to signals related to the location of said designs along said supply path.

A preferred, non-limiting embodiment of the present invention will be described by way of example with reference to the accompanying drawings, in which:

FIGS. 7 and 8 show rear views of the FIG. 5 and 6 jaw in two different operating positions;

Figure 1:
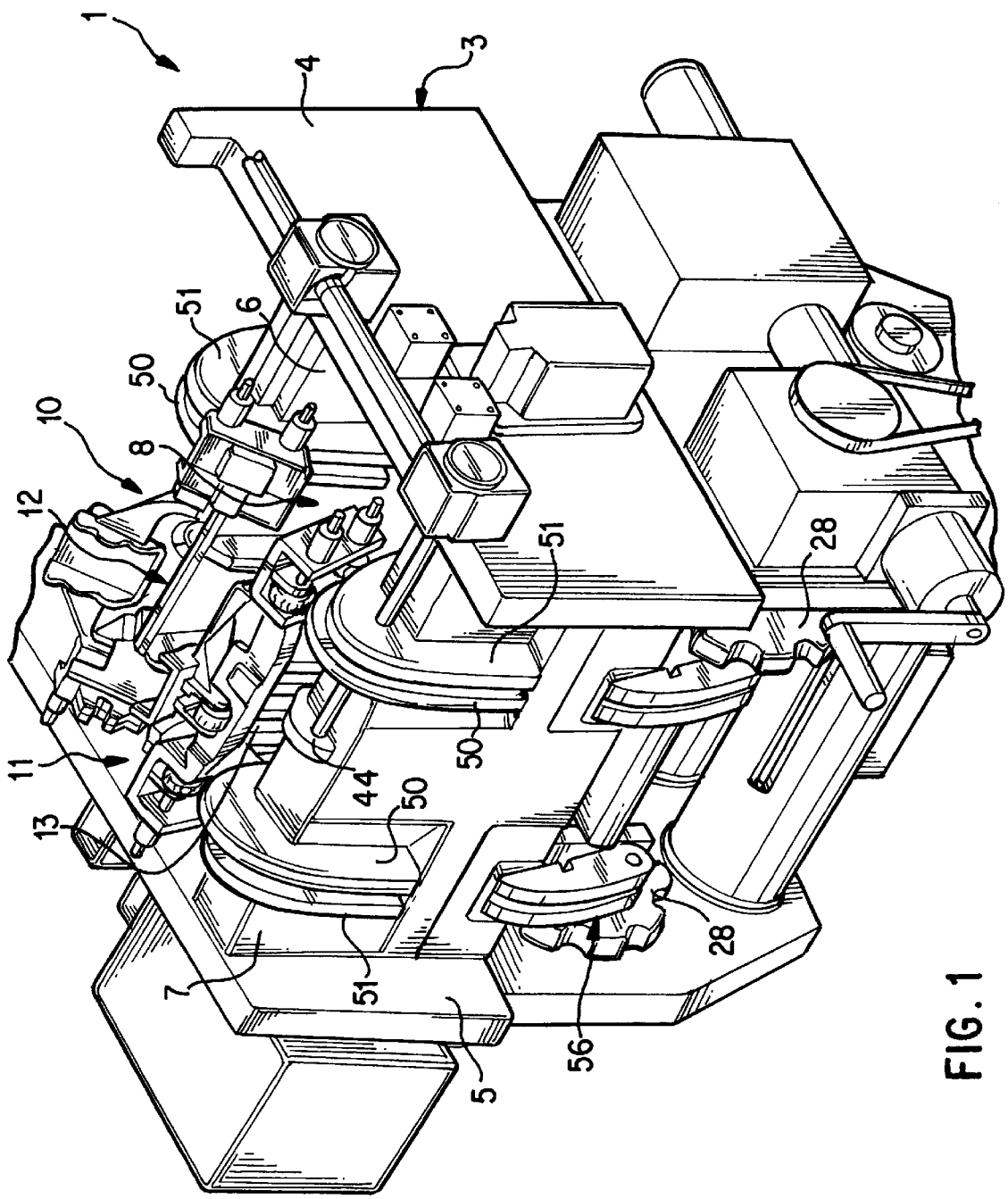
FIG. 1 shows a view in perspective, with parts removed for clarity, of a packaging unit in accordance with the teachings of the present invention.
Figure 2:
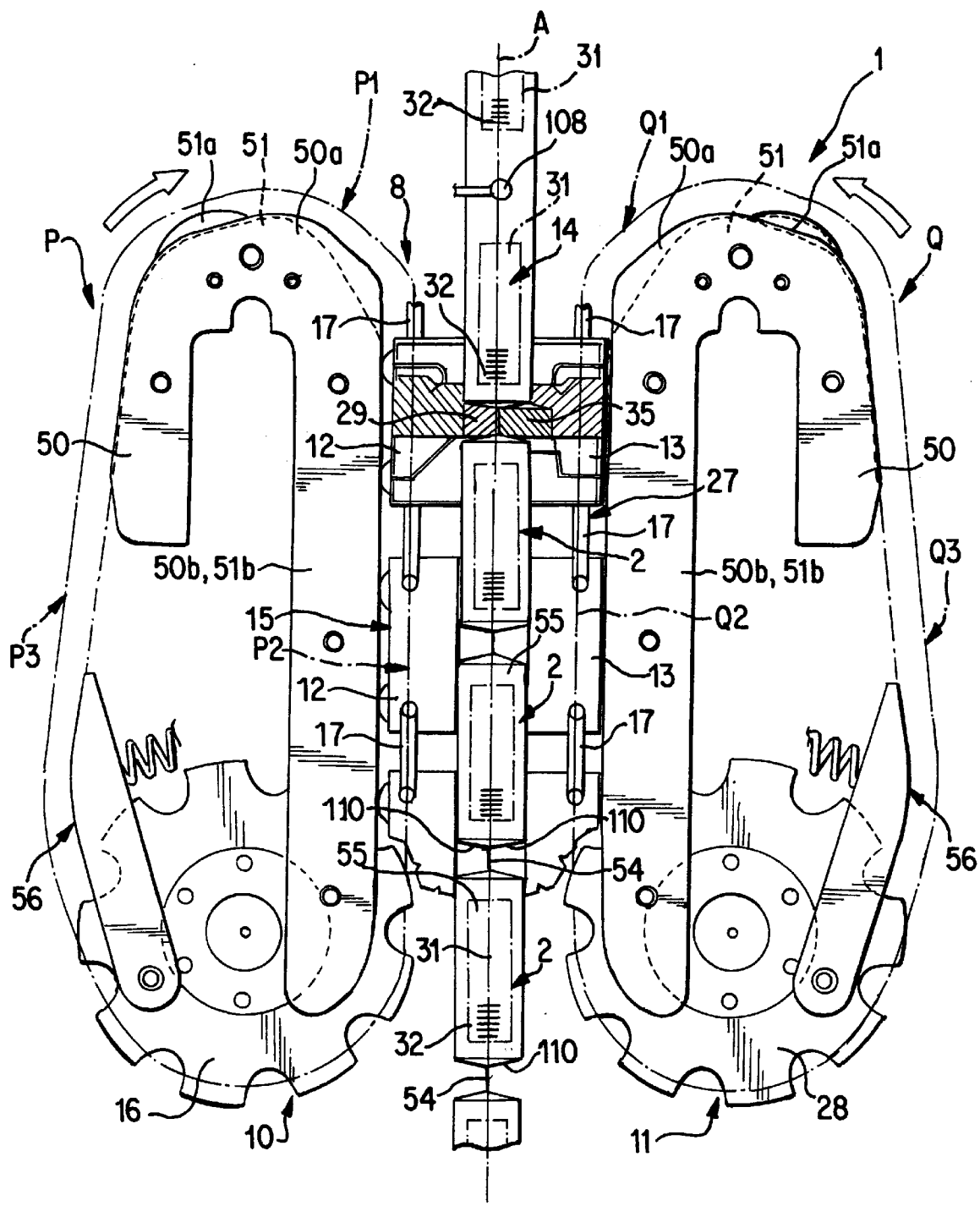
FIG. 2 shows a partial schematic side view of the FIG. 1 unit.

With reference to FIGS. 1 and 2, number 1 indicates a packaging unit for continuously producing, from a tube 14 of packaging material, aseptic sealed packages 2 containing a pourable food product, such as pasteurized or UHT milk, fruit juice, wine, etc.

Figure 5:
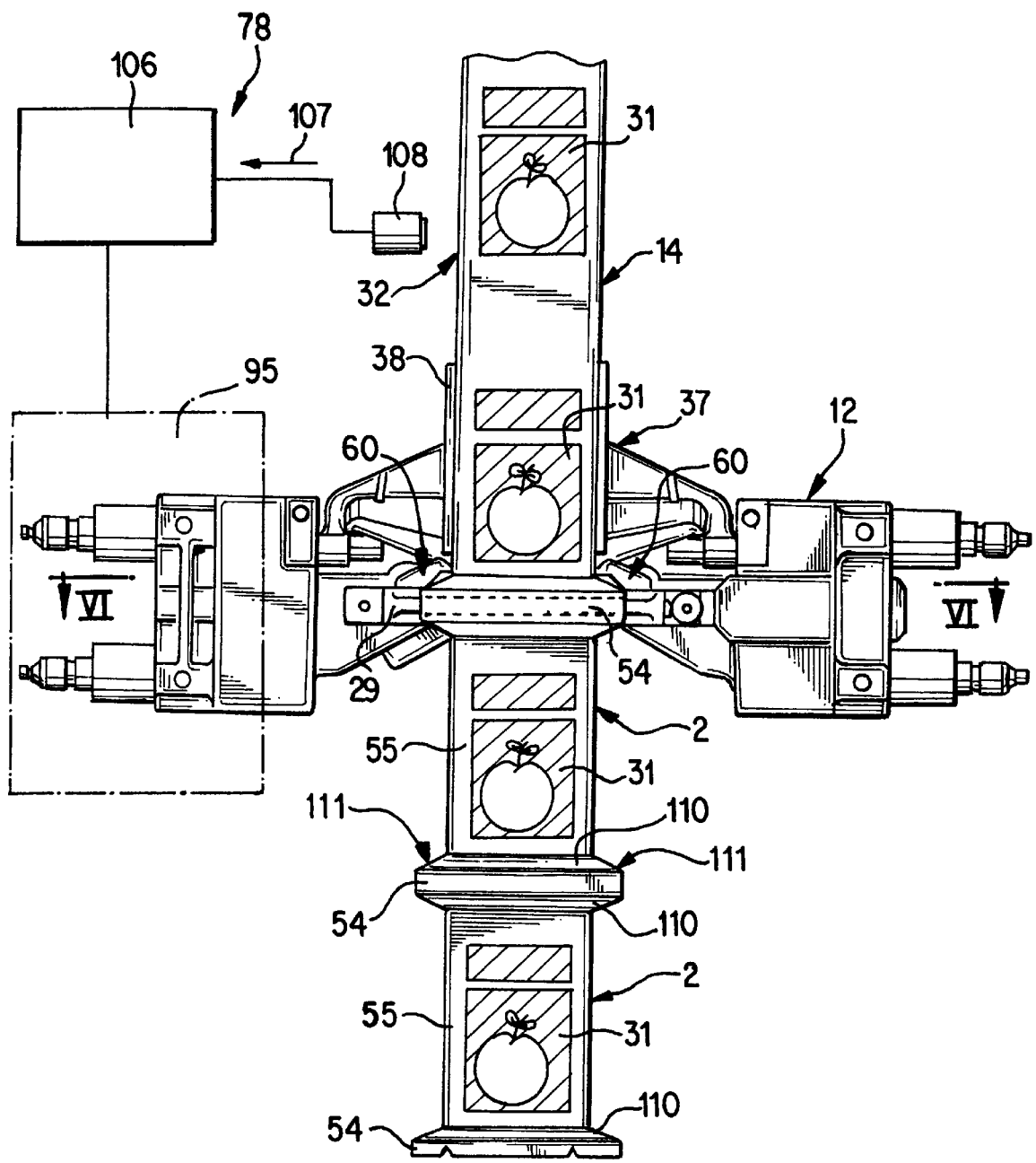
FIG. 5 shows a schematic front view of a jaw cooperating with the packaging material, and of a control device for controlling the setting of the designs on the packaging material.

Tube 14 is formed in known manner upstream from unit 1 by longitudinally folding and sealing a strip of heat-seal material, and is filled with the sterilized or sterile-processed food product for packaging The packaging material from which tube 14 is formed is preprinted with a succession of identical, equally spaced designs 31 (FIG. 5) located on the portions eventually forming the outer surfaces of packages 2, and each of which comprises a bar code 32 (FIG. 2).

Unit 1 comprises a frame 3 (FIG. 1) defined by two side walls 4, 5 and by two parallel transverse walls 6, 7 fitted rigidly between side walls 4, 5 and defining, with side walls 4, 5, an opening 8; and two chain conveyors 10, 11 fitted to frame 3 and respectively comprising jaws 12 (only one shown in FIG. 1) and counter-jaws 13 (only one shown in FIG. 1) cooperating with each other to interact with the tube 14 of packaging material fed along a vertical path A through opening 8.

Conveyors 10 and 11 define respective endless paths P and Q along which jaws 12 and counter-jaws 13 are fed, and which respectively extend about walls 6 and 7 of frame 3.

Conveyor 10 comprises an articulated chain 15 extending along path P; and two drive wheels 16 meshing with and on both sides of chain 15 at the bottom end of path P. Jaws 12 are an integral part of and define alternate links of chain 15, and are connected to one another in articulated manner by pairs of links 17.

Figure 3:
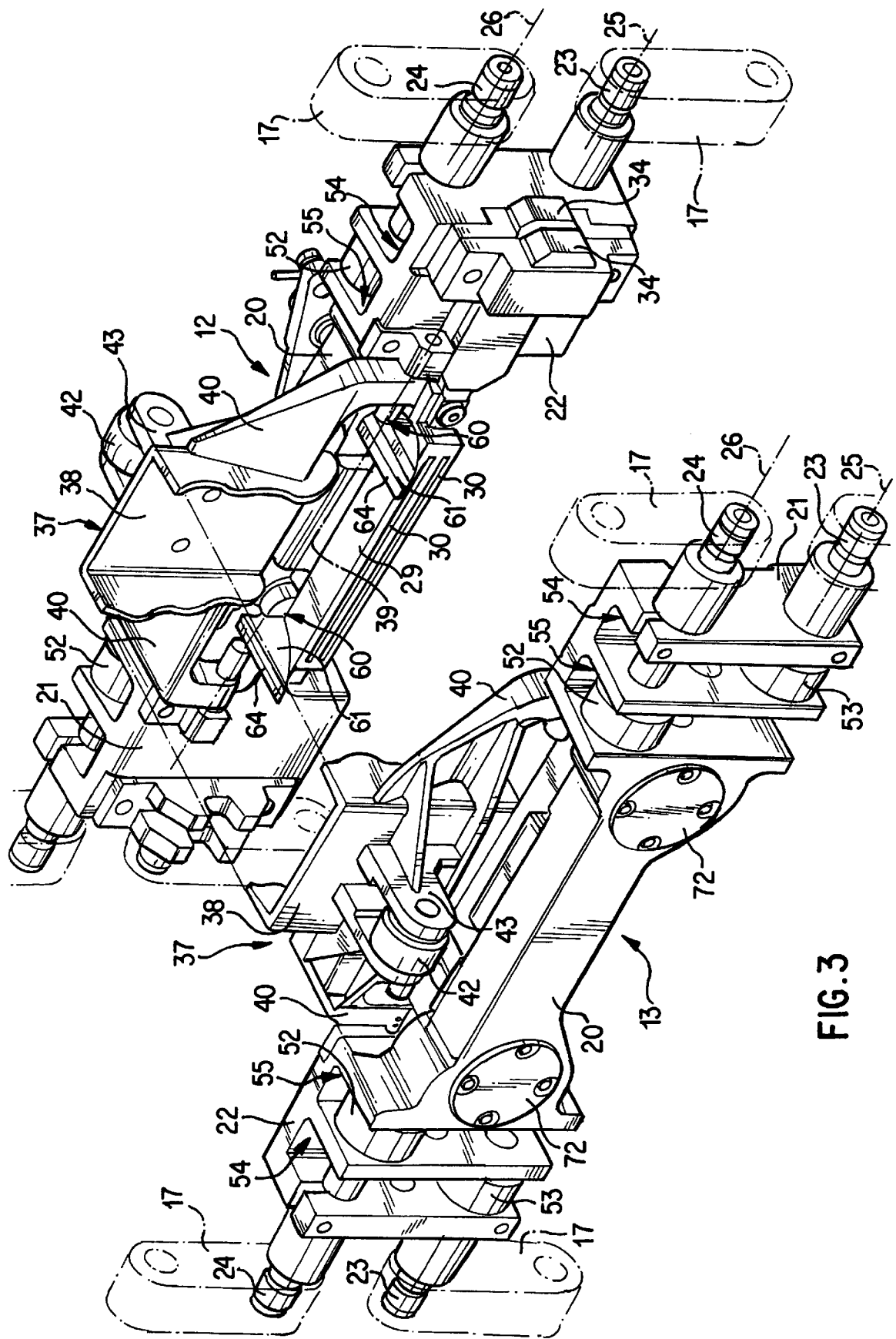
FIGS. 3 and 4 show views in perspective, from opposite sides, of a jaw and corresponding counter-jaw of the FIG. 1 unit.

More specifically, each jaw 12 (FIG. 3) comprises an elongated main body 20 extending in a direction perpendicular to path A and parallel to wall 6, and having respective end projections 21 and 22, each of which has a projecting first and second pin 23, 24 spaced with respect to each other and having respective axes 25, 26 parallel to the main dimension of body 20. Links 17 pivot on pins 23, 24 of jaws 12 so as to connect pins 23 of one jaw 12 to pins 24 of the adjacent jaw.

Similarly, conveyor 11 comprises an articulated chain 27 extending along path Q; and two drive wheels 28 meshing with chain 27 at the bottom end of path Q. Chain 27 is defined by a number of counter-jaws 13 connected in articulated manner to one another and only described in detail insofar as they differ from jaws 12, and using the sare numbering system for any parts similar or corresponding to those described in connection with jaws 12. Briefly, each counter-jaw 13 comprises a main body 20 having pairs of end pins 23, 24 about which links 17 pivot to connect adjacent pairs of counter-jaws 13.

Each jaw 12 (FIG. 3) comprises an induction heating element 29 fitted to main body 20 in a direction crosswise to path A of tube 14, and which in turn comprises a pair of straight, parallel active surfaces 30, and is supplied electrically by a pair of contact brushes 34 cooperating in sliding manner, in use, with a supply bar (not shown) fitted to frame 3 and extending in the region of path P inside opening 8.

Figure 4:
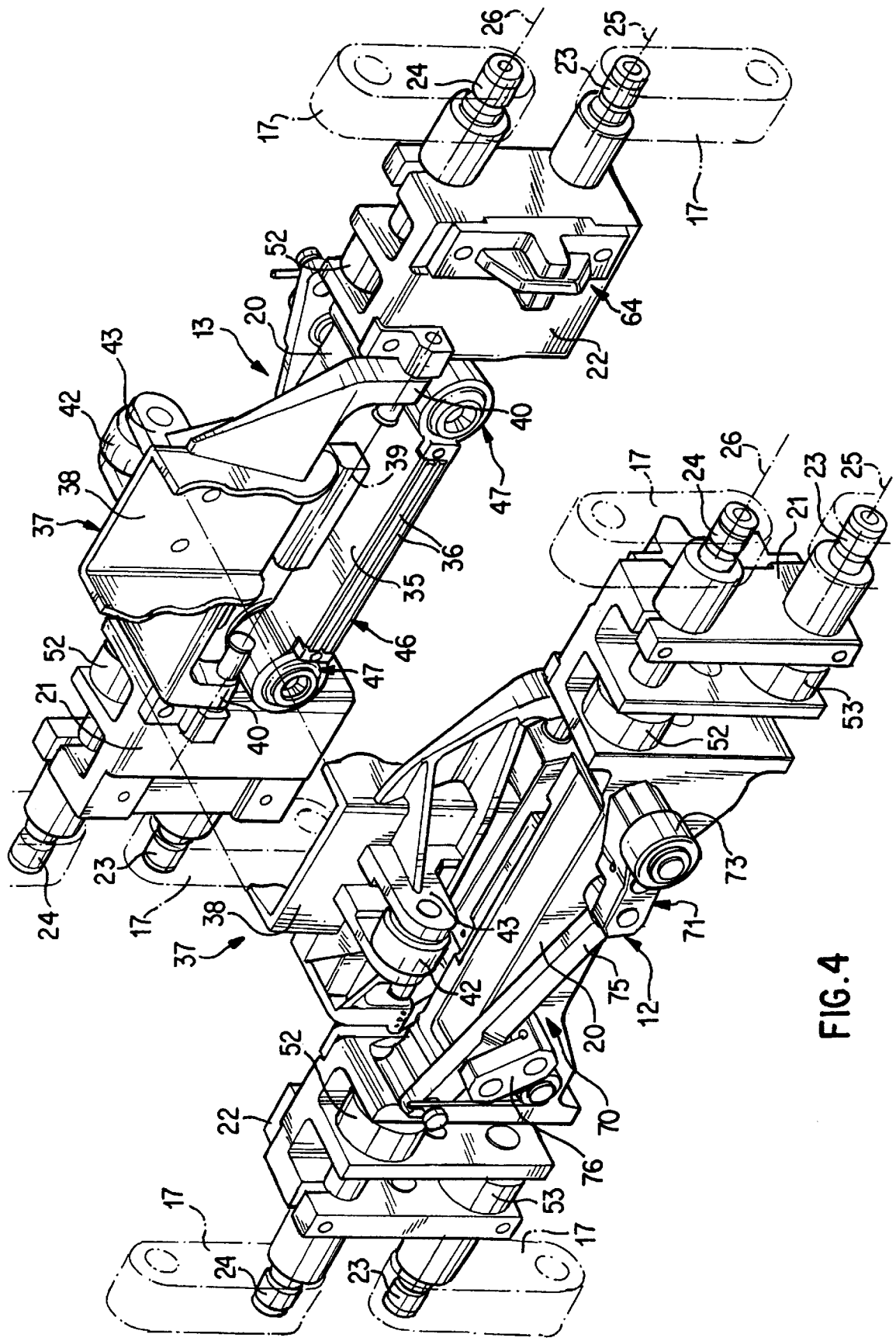

As opposed to a heating element 29, each counter-jaw 13 (FIG. 4) comprises a pressure bar 35, which cooperates with heating element 29 of corresponding jaw 12 to grip a cross section of tube 14 (FIG. 2). On a front surface 46 facing corresponding jaw 12 in use (FIG. 4), bar 35 comprises two bands 36 of relatively flexible elastomeric material, which cooperate with the packaging material in opposition to the active surfaces 30 of heating element 29.

Jaws 12 and counter-jaws 13 (FIGS. 3 and 4) each comprise a respective control device 37 for controlling the volume of package 2 as it is being formed. Each device 37—not forming part of the present invention, and therefore not described in detail—substantially comprises a half shell 38 hinged to main body 20 about an axis 39 parallel to axes 25, 26 by two lateral supporting brackets 40 integral with half shell 38, which cooperates frontally with a complementary half shell to form a substantially parallelepiped cavity housing package 2 as it is being formed. Each device 37 also comprises a cam follower roller 42 fitted idly to a supporting bracket 43 extending integrally from the rear of respective half shell 38.

Cam followers 42 of jaws 12 and counter-jaws 13 cooperate with respective cams 44 fitted to walls 6 and 7 of frame 3, and of which only the one relative to conveyor 11 is shown in FIG. 1.

The movement of jaws 12 and counter-jaws 13 is controlled by respective pairs of cams 50, 51 fitted to walls 6, 7 of frame 3 and cooperating with respective pairs of cam follower rollers 52, 53 fitted to respective end projections 21, 22 of jaws 12 and counter-jaws 13. The rollers 52, 53 in each pair are coaxial with respective pins 24, 23 and offset axially with respect to each other so as to cooperate with respective cams 50, 51.

More specifically, wall 6 (FIG. 1) is fitted with two pairs of cams 50, 51 cooperating with respective pairs of rollers 52, 53 of jaws 12; and, similarly, wall 7 is fitted with two pairs of cams 50, 51 cooperating with respective pairs of rollers 52, 53 of counter-jaws 13.

Cams 50, 51 comprise respective substantially U-shaped portions 50a, 51a extending about the top edge of respective walls 6, 7 to define, for respective chains 15, 27 of conveyors 10, 11, a transmission opposite respective drive wheels 16 and 28; and respective portions 50b, 51b extending along respective walls 6, 7, inside opening 8. Portions 50a, 51a define path portions P1, Q1 along which jaws 12 and counter-jaws 13 approach and contact tube 14 of packaging material; and portions 50b, 51b define facing, substantially parallel path portions P2, Q2 along which jaws 12 and counter-jaws 13 are maintained contacting under pressure to form the seals defining packages 2 at respective substantially flat transverse sealing bands 54, and so form a continuous strip defined by a number of parallelepiped container portions 55 connected by sealing bands 54, which are cut, downstream from unit 1, to form packages 2.

Cams 50, 51 release respective chains 15, 27 at respective portions P3, Q3 of paths P and Q downstream from respective drive wheels 16, 28.

Along portions P3, Q3, chains 15, 27 cooperate with respective pairs of tensioners 56 for so tensioning the chains as to ensure rollers 52, 53 of jaws 12 and counter-jaws 13 are maintained contacting relative cams 50, 51.

According to the present invention, jaws 12 each comprise a respective pair of movable elements 60 for interacting with and correctly feeding tube 14 of packaging material.

Figure 6:
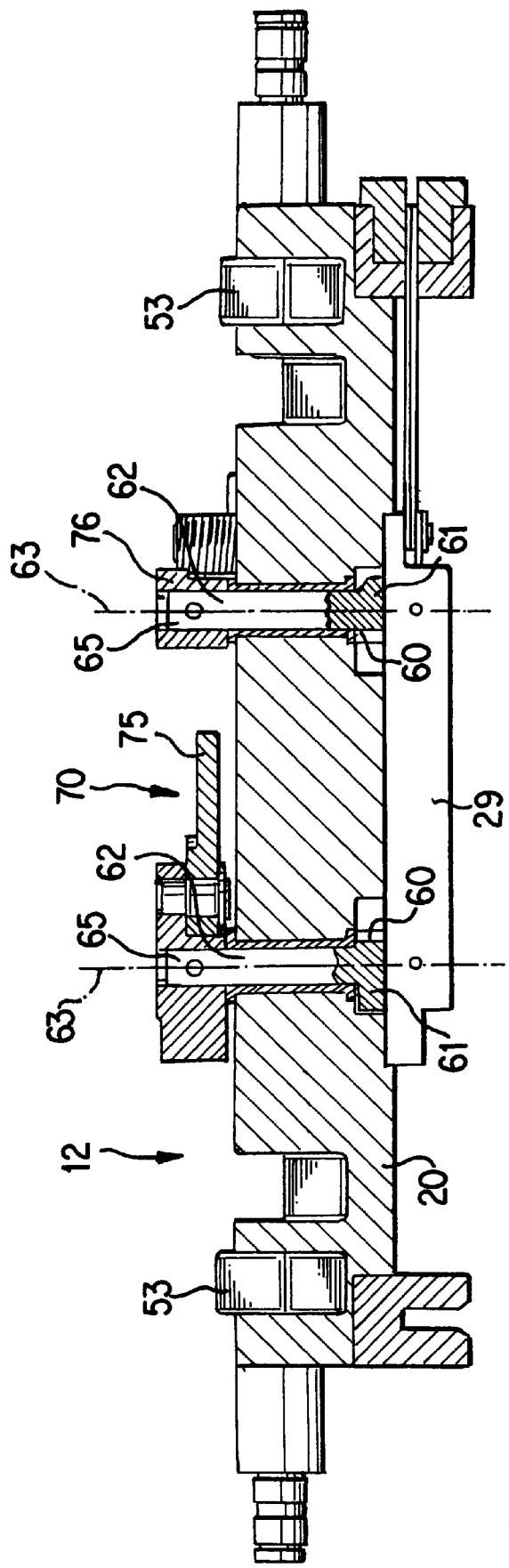
FIG. 6 shows a section along line VI—VI in FIG. 5.

Elements 60 (FIGS. 3 and 6) comprise respective draw tabs 61 located on either side of path A of tube 14 and symmetrical with and adjacent to tube 14. Tabs 61 are integral with respective pins 62 having respective axes 63 perpendicular to path A and to the main dimension of heating element 29, extend substantially radially with respect to pins 62, and comprise respective lateral edges 64 substantially parallel to axes 63 of pins 62 and for cooperating with tube 14.

Pins 62 are fitted in angularly free manner through main body 20 of jaw 12 (FIG. 6), and comprise respective end portions 65 projecting from the rear of body 20.

Pins 62 are counter-rotated, i.e. to describe the same angles in opposite directions and so move tabs 61 symmetrically with respect to path A, by an articulated mechanism 70 (FIGS. 4, 6, 7 and 8) on the rear side of main body 20.

Mechanism 70 comprises a first-order control lever 71 fitted to end 65 of the pin 62 located, in use, on the side wall 5 side of frame 3, and which defines the pivot of lever 71.

Lever 71 (FIGS. 7 and 8) comprises a first arm 72 fitted on the end with a cam follower roller 73 having an axis parallel to the axes of pins 62 and substantially facing side wall 5 in the idle position (FIG. 7); and a second arm 74 facing, in use, in substantially the opposite direction to first arm 72. A rod 75 pivots on second arm 74, extends crosswise to main body 20, intersects a plane containing the axes of pins 62, and is hinged, close to the opposite end 67, to a rod 76 in turn fitted to end portion 65 of the other pin 62.

A spring 66, connected to the main body, acts on the free end 67 of rod 75 to normally maintain mechanism 70 in an idle position in which lever 71 is almost horizontal, and cam follower roller 73 projects laterally outwards of jaw 12, i.e. away from supply path A of tube 14, with respect to pin 62 of lever 71.

Cam follower roller 73 cooperates with a variable-profile cam unit 77 (FIGS. 9 to 12) fitted to wall 6 and adjacent to a cam 50.

Figure 9:
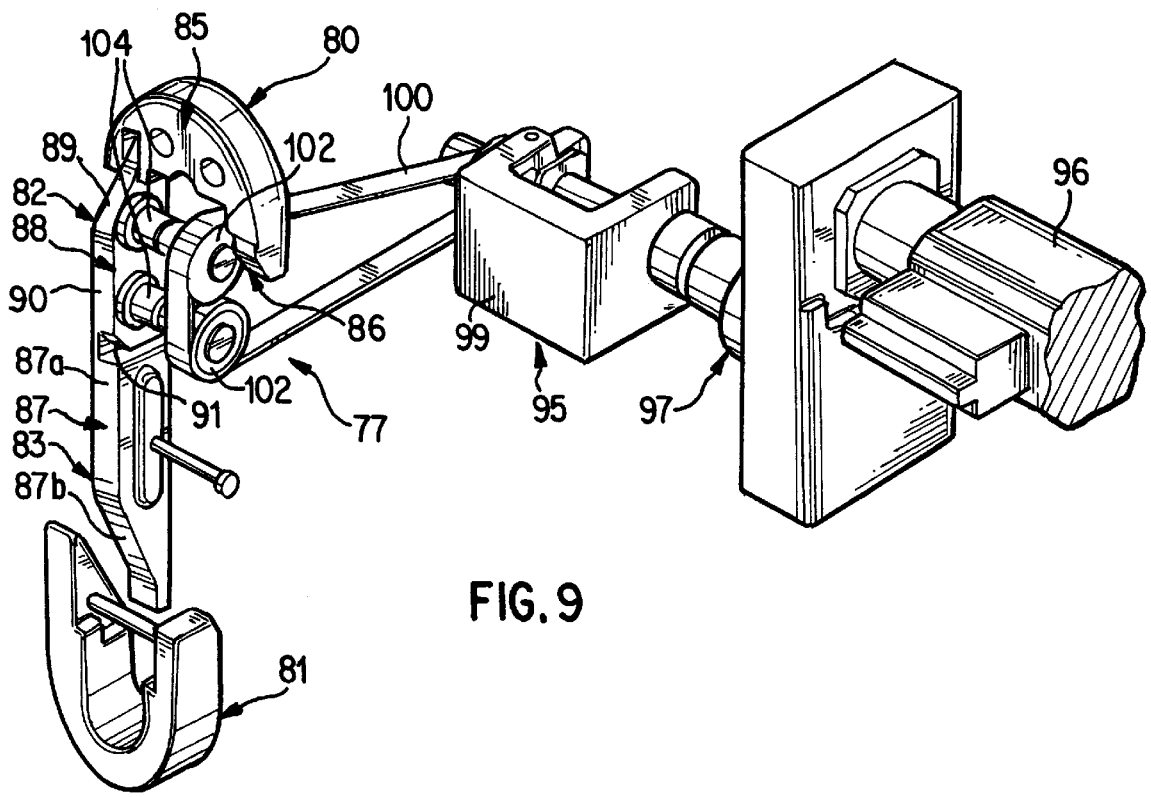
FIGS. 9 and 10 show views in perspective, from opposite sides, of a control assembly forming part of the FIG. 5 control device.
Figure 10:
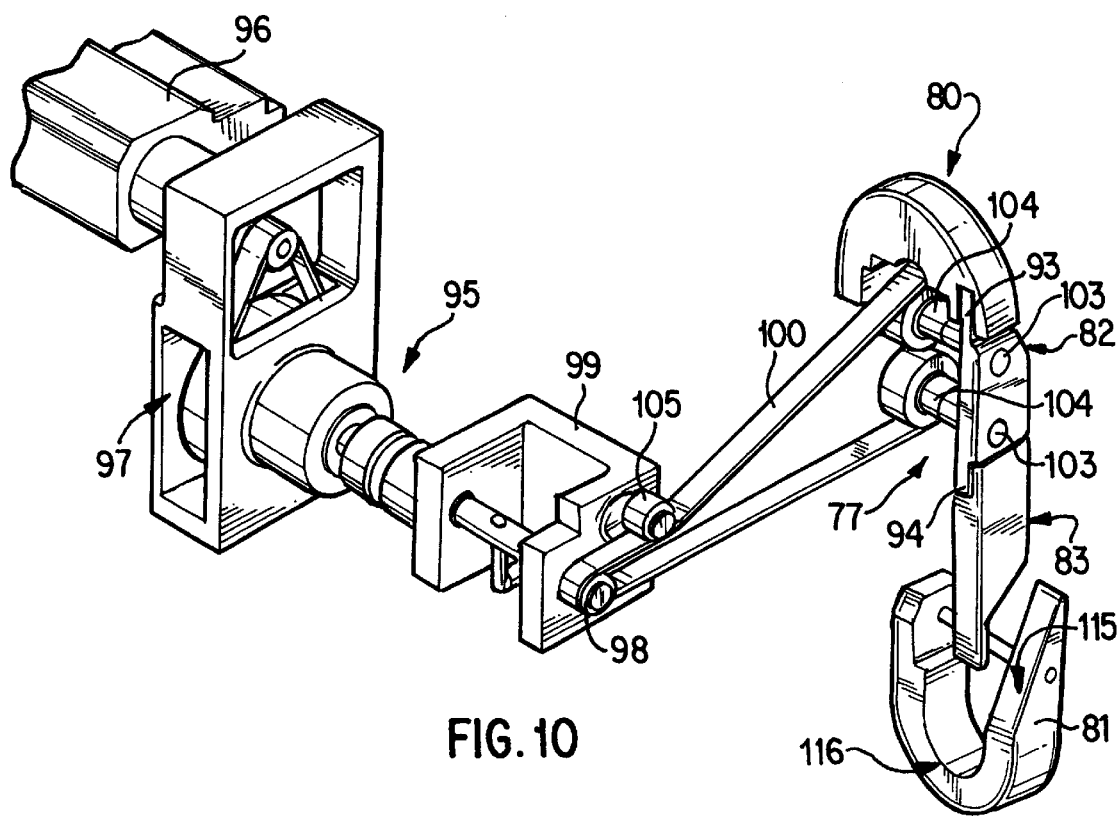
Figure 11:
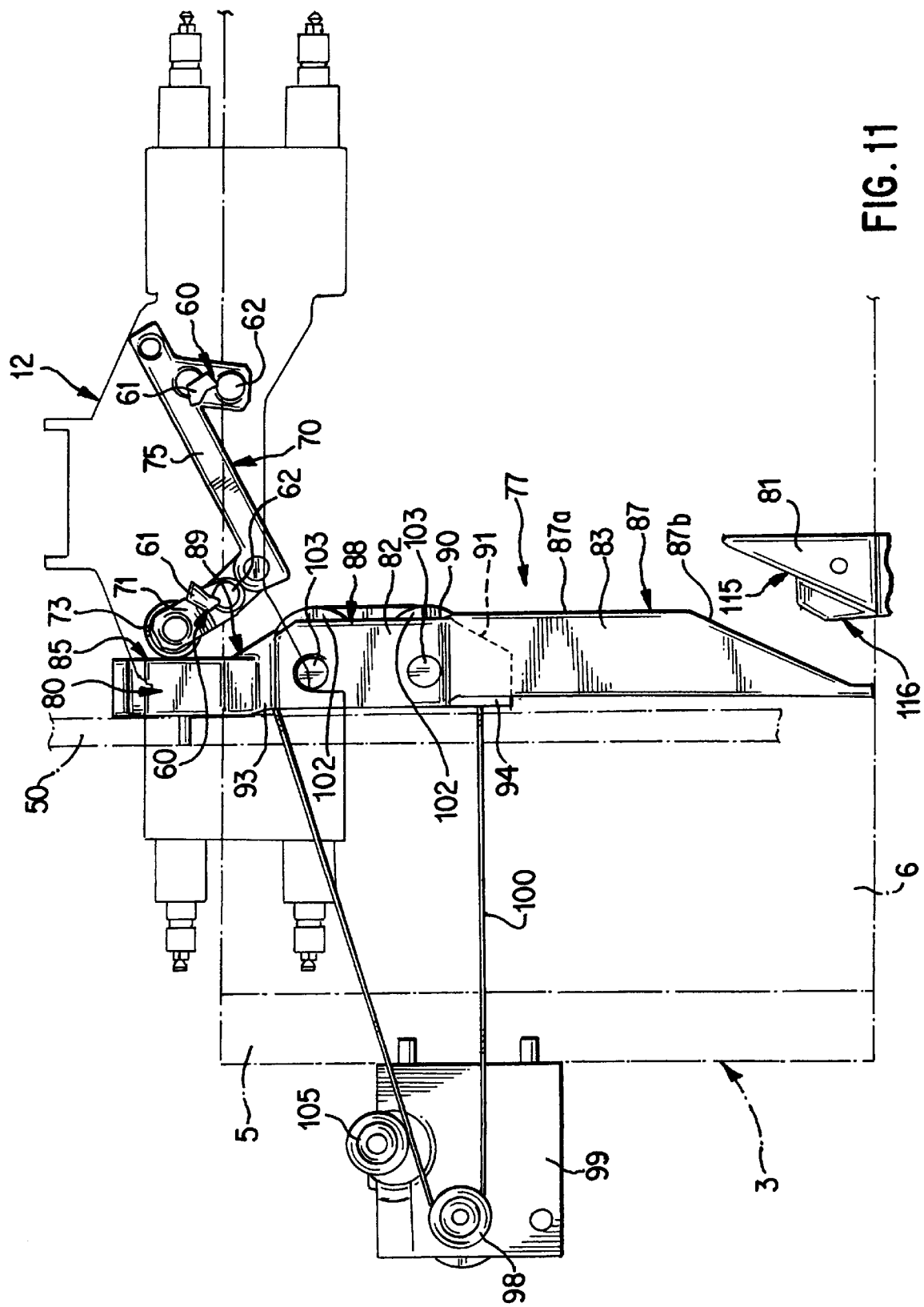
FIGS. 11 and 12 show schematic partial views, with parts removed for clarity, of the FIG. 9 and 10 assembly and a jaw in two different operating positions.

Unit 77 is associated with a control assembly 95 shown in detail in FIGS. 9 and 10 and forming part, with unit 77, of a control device 78 for controlling the movement of elements 60. In FIG. 11, wall 6 and side wall 5 of frame 3 of unit 1 are shown schematically by dot-and-dash lines to illustrate clearly the arrangement of the various parts of control assembly 95 with respect to frame 3.

Cam unit 77 (FIGS. 9 to 12) substantially comprises a substantially U-shaped fixed top cam 80 and a substantially U-shaped fixed bottom cam 81 fitted about respective top and bottom edges of wall 6 to control the position of cam follower roller 73, and hence mechanism 70, at the opposite ends of path P of jaws 12; and a movable cam 82 and a fixed cam 83 located along wall 6, inside opening 8, for controlling the position of roller 73 substantially along portion P2 of path P of jaws 12.

More specifically, fixed cam 80 is fitted to the top edge of wall 6, laterally contacting a cam 50 (FIG. 11), and comprises for cam follower roller 73, on the opposite side to cam 50, a rolling track 85 lying substantially in a vertical plane along the whole of its length, with the exception of a lead-in ramp portion 86 (FIG. 9) at the end of cam 80 outside wall 6.

Fixed cam 83 is rigidly connected to wall 6, and defines, for roller 73, a rolling track 87 having a substantially flat, vertical first portion 87a closer by a predetermined amount to path A with respect to the plane of track 80 (FIGS. 11 and 12), and a successive downward ramp portion 87b terminating substantially in the same plane as the start of lead-in portion 86 of cam 80.

Movable cam 82 (FIGS. 9 and 11) is supported, close to wall 6 and between fixed top cam 80 and fixed cam 83, so as to move in a plane parallel to wall 6, and defines a substantially trapezoidal rolling track 88 comprising an upward ramp portion 89 adjacent to fixed cam 80, a constant-lift intermediate portion 90, and a downward ramp portion 91 adjacent to fixed cam 83.

Portions 89 and 91 are formed on respective end portions 93, 94 of movable cam 82 connected respectively in sliding manner to fixed cam 80 and fixed cam 83, so as to continuously connect rolling tracks 85, 88 and 87.

Cam 82 is movable in a substantially parallel direction with respect to wall 6 (FIGS. 11 and 12) so as to vary both the maximum lift of the cam defined by intermediate portion 90, and the points respectively connecting portions 89 and 91 of cam 82 to track 85 of fixed cam 80 and to track 87 of fixed cam 83.

The movement of cam 82 is controlled by control assembly 95 shown in FIGS. 9 and 10.

Control assembly 95 substantially comprises an electric servomotor 96 fitted in a stationary position to side wall 5 of unit 1, and which, via a first belt transmission 97, powers a drive pulley 98 having an axis perpendicular to wall 6 and fitted to a bracket 99 in turn fitted to side wall 5. Pulley 98 cooperates with a belt 100 extending about two driven pulleys 102 fitted to respective shafts 104, which are in turn fitted through respective seats (not shown) in wall 6, and the axes of which are parallel to each other and lie in a common vertical plane perpendicular to wall 6.

At the respective ends opposite pulleys 102, shafts 104 define respective eccentric pins 103 supporting movable cam 82 and engaging respective seats of cam 82 in relatively rotating manner. Pins 103 define, in relation to the axes of shafts 104, an articulated parallelogram system for moving cam 82, parallel to itself, between ;i withdrawn position (FIG. 11) in which intermediate portion 90 is substantially aligned with track 87 of fixed cam 83, and a forward position (FIG. 12) in which intermediate portion 90 projects considerably with respect to track 87 of fixed cam 83.

Fixed bottom cam 81 is substantially for safety purposes, and cooperates with roller 73, on the opposite side to cams 80, 82 and 83, to ensure mechanism 70 is restored to the FIG. 7 idle position; for which purpose, cam 81 comprises a first portion 115 substantially parallel to portion 87b of fixed cam 83, and a constant-lift portion 116 for maintaining roller 73 in the FIG. 11 position.

Belt 100 is kept taut by a conventional tensioner 105 fitted to bracket 99.

Servomotor 96 is connected to a control unit 106 for monitoring operation of unit 1, and which is supplied with a signal 107 generated by an optical sensor 108 facing tube 14, upstream from the point at which jaws 12 and counter-jaws 13 interact with the tube, and for detecting the presence of bar codes 32 of designs 31.

Unit 106 compares the instant in which bar code 32 is detected by optical sensor 108 with a time window defined by a clock in unit 106.

Unit 1 operates as follows.

Conveyors 10, 11 are rotated in known manner in opposite directions, as indicated by the arrows in FIG. 2, so that, from the end of portions P1, Q1 of respective paths P, Q and along respective portions P2, Q2, respective jaws 12 and counter-jaws 13 cooperate with tube 14 of packaging material according to a movement defined by the profiles of cams 50, 51.

In the following detailed description of the operating cycle, reference is made to one jaw 12 and respective counter-jaw 13, all the other jaws 12 and counter-jaws 13 obviously performing the same cycle at time intervals depending on the output rate.

Along portions P1 and Q1, jaw 12 and respective counter-jaw 13 are brought together to gradually deform and flatten tube 14 at a transverse band 54.

At the end of portions P1, Q1, devices 37 for controlling the volume of packages 2 are activated, and half shells 38 of jaw 12 and counter-jaw 13 are mated frontally to define a parallelepiped cavity in turn defining the volume of container portion 55 of package 2 being formed.

Each container portion 55 is connected to each sealing band 54 by a pair of substantially trapezoidal connecting walls 110 (FIGS. 2 and 5) formed as tube 14 is gradually compressed by jaw 12 and counter-jaw 13 along portions P1, Q1 of respective paths P, Q, and which comprise respective inclined lateral edges 111 with which movable elements 60 cooperate as of the end of portions P1, Q1, i.e. before the maximum gripping pressure is applied.

Along portions P2, Q2 of respective paths P, Q, jaw 12 and counter-jaw 13 are pressed against tube 14; and heating element 29 is supplied to seal the two superimposed portions of packaging material forming band 54.

The following is a detailed description of the way in which movable elements 60 are controlled by cam unit 77 and relative control assembly 95.

As jaw 12 travels along portion P1 of path P, cam follower roller 73 cooperates with fixed top cam 80, which first moves roller 73 from the idle position by means of portion 86 and then maintains it in an intermediate position by means of portion 87 (FIG. 11); the rotation of lever 71 resulting from the movement of roller 73 produces a rotation of pin 62 of lever 71 and a similar opposite rotation of the other pin 62, to which motion is transmitted by the inverted articulated parallelogram system defined by arm 74, rod 75 and rod 76.

The rotation of pins 62 causes tabs 61 of elements 60 to move towards tube 14.

As roller 73 reaches ramp portion 89 of movable cam 82, lever 71 is gradually rotated further, so that, for the reasons given above, tabs 61 of elements 60 are moved further towards tube 14, interact at this point with edges 111 of walls 110, and so draw tube 14 downwards.

Figure 12:
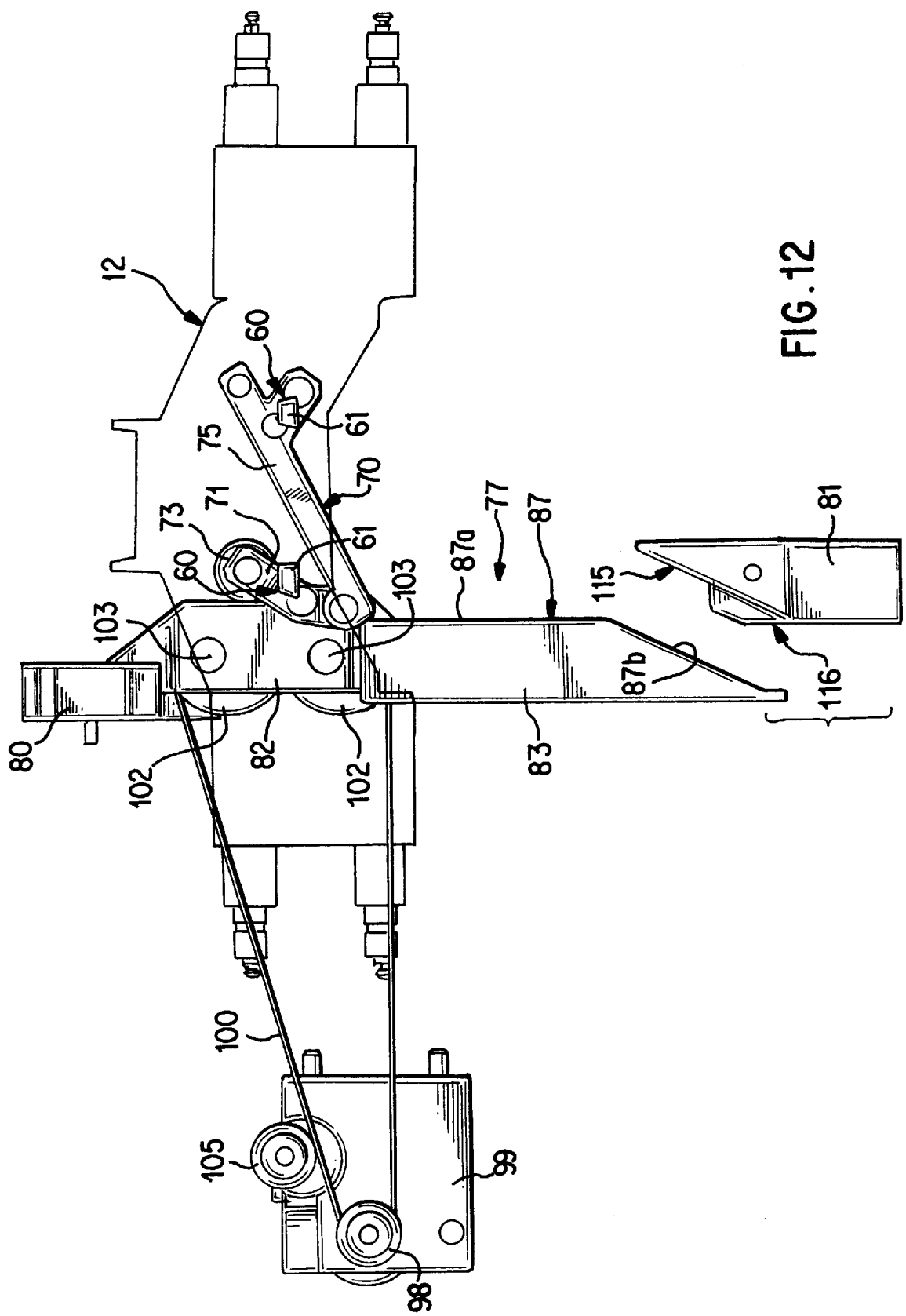

The extent of the above action depends on the position of movable cam 82, which is controlled by assembly 95 under the control of unit 106, and is movable between the FIG. 11 and 12 limit positions described above.

Unit 106 determines whether signal 107, generated by optical sensor 108 and indicating the presence of a bar code 32, is generated within a predetermined time window depending on a clock in unit 106.

In the event of a positive response, indicating designs 31 of the packaging material are positioned correctly, the position of cam 82 is left unchanged.

Conversely, in the event bar code 32 is detected early or late with respect to the time window, unit 106 so controls servomotor 96 as to rotate drive pulley 98 in one direction or the other.

For example, in the event the bar code is detected late, pulley 98 is rotated clockwise with reference to FIGS. 11 and 12; belt 100 transmits the rotation of pulley 98 to driven pulleys 102, which, as shown by comparing FIGS. 11 and 12, rotate pins 103 eccentrically to move cam 82 forwards; and the movement of roller 73 with respect to its idle position, which reaches a maximum at portion 90 of movable cam 82, is increased, thus also increasing the travel of tabs 61 and the drawing action exerted by tabs 61 on tube 14.

Downstream from movable cam 82, roller 73 follows the profile of fixed cam 83, the portion 87b of which resets roller 73 to the idle position, so that tabs 61 of elements 60 are detached from tube 14; and the profile of fixed bottom cam 81 is such as to ensure roller 73 is maintained in this position until jaw 12 ceases to interact with the packaging material.

Though the above description relates to the control of one jaw 12, all the jaws 12 of conveyor 10 obviously interact successively with cam unit 77, so that each jaw 12 exerts more or less pull on tube 14, and the position of cam 82 is adjusted with time and controlled in closed-loop manner to ensure the designs of packages 2 are centered correctly.

The advantages of unit 1 according to the teachings of the present invention will be clear from the foregoing description.

In particular, supply of tube 14 is corrected in real time to ensure the designs on each package are centered correctly; which correction is made in a straightforward, reliable manner by controlling a substantially stationary member (movable cam 82) interacting purely mechanically with jaws 12.

Moreover, using the bar code as a reference element provides for extremely straightforward location of the designs.

Clearly, changes may be made to unit 1 as described and illustrated herein without, however, departing from the scope of the claims.

We claim:

1. A packaging unit for continuously producing aseptic sealed packages, containing a pourable food product, from a tube made of heat-seal packaging material in sheet form, fed along a vertical supply path, and filled with said food product, said tube of packaging material including a succession of identical, equally spaced designs located on the portions eventually forming the outer surface of said packages, said unit comprising:

a first chain conveyor having a number of jaws and defining an endless first path along which said jaws are fed;

a second chain conveyor having a number of counter-jaws and defining an endless second path along which said counter-jaws are fed;

said first Xth and said second path comprising respective work portions adjacent to said supply path, extending substantially symmetrically on opposite sides of said supply path so that said jaws cooperate with respective counter-jaws to grip and heat-seal respective equally spaced transverse bands of said tube;

wherein said jaws comprise drawing means movable with respect to said jaws for interacting with said tube of packaging material to correctly feed said tube along said tube supply path, and control means for controlling said drawing means in response to signals related to the location of said designs along said supply path;

wherein said drawing means comprises, for each jaw, a pair of movable elements for cooperating on opposite sides with said tube of packaging material, said movable elements connected to each jaw and spaced-apart from each other, and an actuating mechanism for activating said movable elements positioned intermediate said movable elements.

2. A unit in accordance with claim 1, wherein said control means comprises a cam unit with a variable profile, located in a substantially stationary position close to said first conveyor, and interacting successively with said actuating mechanisms of said jaws.

3. A unit in accordance with claim 2, wherein said cam unit comprises a movable cam defining said variable profile of said cam unit, said control means further comprising a servomotor for controlling said movable cam, and transmission means interposed between said servomotor and said movable cam.

4. A packaging unit for continuously producing aseptic sealed packages, containing a pourable food product, from a tube made of heat-seal packaging material in sheet form, fed along a vertical supply path, and filled with said food product, said tube of packaging material including a succession of identical, equally spaced designs located on the portions eventually forming the outer surface of said packages, said unit comprising:

a first chain conveyor having a number of jaws and defining an endless first path along which said jaws are fed;

a second chain conveyor having a number of counter-jaws and defining an endless second path along which said counter-jaws are fed;

said first path and said second path comprising respective work portions adjacent to said tube supply path extending substantially symmetrically on opposite sides of said supply path, so that said jaws cooperate with respective counter-jaws to grip and heat-seal respective equally spaced transverse bands of said tube;

wherein said jaws comprise drawing means movable with respect to said jaws for interacting with said tube of packaging material to correctly feed said tube along said supply path, and control means for controlling said drawing means in response to signals related to the location of said designs along said supply path;

wherein said drawing means comprises, for each jaw, a pair of movable elements for cooperating on opposite sides with said tube of packaging material, and an actuating mechanism for activating said movable elements;

wherein said control means comprises a cam unit with a variable profile, located in a substantially stationary position close to said first conveyor, and interacting successively with said actuating mechanisms of said jaws;

wherein said cam unit comprises a movable cam defining said variable profile of said cam unit, said control means further comprising a servomotor for controlling said movable cam, and transmission means interposed between said servomotor and said movable cam;

wherein said transmission means comprises:
  a drive pulley powered by said servomotor;
  a pair of driven pulleys connected eccentrically to said movable cam; and
  a transmission belt cooperating with said drive pulley and with said driven pulleys.

5. A unit in accordance with claim 1, wherein said control means comprises an optical sensor facing said tube supply path to detect a bar code forming part of said designs of said packaging material.

6. A unit in accordance with claim 4, wherein said control means comprises a control unit connected to said servomotor and generating control signals for said servomotor in response to a comparison between respective instants in which said bar codes are detected and a time reference.

7. A unit in accordance with claim 2, wherein said actuating mechanism for activating said movable elements comprises a single cam follower element cooperating with said cam unit, and an articulated system activating both said movable elements in response to displacement of said cam follower element.

8. A packaging unit for continuously producing aseptic sealed packages, containing a pourable food product, from a tube made of heat-seal packaging material in sheet form, fed along a vertical supply path and filled with said food product, said tube of packaging material including a succession of identical, equally spaced designs located on the portions eventually forming the outer surface of said packages, said unit comprising:

a first chain conveyor having a number of jaws and defining an endless first path along which said jaws are fed;

a second chain conveyor having a number of counter-jaws and defining an endless second path along which said counter-jaws are fed;

said first path and said second path comprising respective work portions adjacent to said tube supply path extending substantially symmetrically on opposite sides of said supply path, so that said jaws cooperate with respective counter-jaws to grip and heat-seal respective equally spaced transverse bands of said tube;

wherein said jaws comprise drawing means movable with respect to said jaws for interacting with said tube of packaging material to correctly feed said tube along said supply path, and control means for controlling said drawing means in response to signals related to the location of said designs along said supply path;

wherein said drawing means comprises, for each jaw, a pair of movable elements for cooperating on opposite sides with said tube of packaging material, and an actuating mechanism for activating said movable elements;

wherein said control means comprises a cam unit with a variable profile, located in a substantially stationary position close to said first conveyor, and interacting successively with said actuating mechanisms of said jaws;

wherein said actuating mechanism for activating said movable elements comprises a single cam follower element cooperating with said cam unit, and an articulated system activating both said movable elements in response to displacement of said cam follower element; and wherein said movable elements comprise rotary pins rotatable with respect to said jaws, and tabs fitted eccentrically to said rotary pins.

* * * * *